United States Patent [19]
Sutherland et al.

[11] Patent Number: 5,436,810
[45] Date of Patent: Jul. 25, 1995

[54] PORTABLE HEADLAMP

[75] Inventors: Scott A. Sutherland, Vancouver, Canada; Thomas K. Geraty, Mt. Joy, Pa.; Robert S. Choi, Landisville, Pa.; C. Kwai Kong; C. Philip Hope, both of Lancaster, Pa.

[73] Assignee: Vistalite, Inc., Lancaster, Pa.

[21] Appl. No.: 929,219

[22] Filed: Aug. 13, 1992

[51] Int. Cl.⁶ ............... B62J 6/02; F21V 33/00; F21L 7/00
[52] U.S. Cl. .................. 362/72; 362/183; 362/191; 362/269; 362/188; 362/382; 362/430; 24/71 ST; 24/193; 24/197; 248/231
[58] Field of Search ............ 362/187, 188, 396, 74, 362/190, 191, 198, 183, 269, 197, 103, 104, 105, 106, 72, 430, 382, 226; 248/231; 224/30 A, 39, 41; 24/193, 197, 191, 71 TD, 71 ST, 270, 271

[56] References Cited

U.S. PATENT DOCUMENTS

| | | | |
|---|---|---|---|
| 455,967 | 7/1891 | Lusk et al. | 24/271 |
| 1,648,709 | 11/1927 | Winsell | 362/203 X |
| 2,117,967 | 5/1938 | Leipold et al. | 362/105 |
| 2,596,887 | 5/1952 | Brundage | 362/197 X |
| 2,710,334 | 6/1955 | Peterson | 362/208 X |
| 3,441,987 | 5/1969 | Cregier | 24/271 |
| 3,550,824 | 12/1970 | Bohanski | 362/103 X |
| 4,286,311 | 8/1981 | Maglica | 362/187 X |
| 4,376,965 | 3/1983 | Bacevios | 362/191 |
| 4,586,113 | 4/1986 | Tsuyama | 362/72 |
| 5,144,546 | 9/1992 | Burdi | 362/191 |

FOREIGN PATENT DOCUMENTS

| | | | |
|---|---|---|---|
| 707313 | 7/1931 | France | 362/202 |
| 3940937 | 6/1991 | Germany | 362/72 |
| 344169 | 3/1931 | United Kingdom | 362/190 |
| 437597 | 10/1935 | United Kingdom | 362/72 |
| 438049 | 11/1935 | United Kingdom | 362/72 |
| 438168 | 11/1935 | United Kingdom | 362/72 |
| 493944 | 10/1938 | United Kingdom | 362/72 |
| 1206761 | 9/1970 | United Kingdom | 3362/72 |

Primary Examiner—Carl D. Price
Attorney, Agent, or Firm—Burns, Doane, Swecker & Mathis

[57] ABSTRACT

A portable headlamp that is particularly designed for use with bicycles integrates a number of essential features and functions desired by modern bicyclists. The headlamp has an easily removable and universally mountable fastening system that requires no tools to install. The mounting system includes a rotary joint that enables a headlamp to be pointed in any desired direction while maintaining a constant friction that can be set by the user. A focussable light beam enables the operator to vary the light distribution pattern, thereby making the headlamp suitable for use under a number of different conditions. The electrical system for the headlamp can be readily upgraded to accommodate the needs of different riding conditions, without requiring additional parts. All of these features are contained within a compact, streamlined housing that is designed to accommodate batteries in a manner that maintains the center of gravity of the headlamp coincident with its mounting point, thereby increasing its stability under rough riding conditions.

15 Claims, 5 Drawing Sheets

PORTABLE HEADLAMP

FIELD OF THE INVENTION

The present invention is directed to a compact, portable light source that can be readily attached to and removed from a tubular structure or frame. In particular, the present invention is directed to a portable light source that is compact, versatile and rugged enough to function as a safety headlamp for a bicycle, and which can be upgraded for use in a variety of different riding situations.

BACKGROUND OF THE INVENTION

Most headlamps that are used on bicycles are intended to be attached to the tubular handlebar of the bicycle. In a conventional bicycle, the handlebar includes a crosspiece that is oriented in a direction perpendicular to the frame of the bicycle. Typically, a bicycle headlamp is designed to be attached to this crosspiece so that it projects a beam of light in the forward direction of the bicycle.

Recently, aerodynamically styled handlebars have become popular. Quite often, these types of handlebars do not have a crosspiece which is perpendicular to the direction of movement of the bicycle. Rather, all of the various sections of the handlebar are contoured to fit the rider's profile, and do not offer a suitable location for mounting a headlamp that is designed to be attached to a perpendicular crosspiece. As a result, if a headlamp of this type is mounted to the handlebar, its beam points in a direction other than the forward direction of the bicycle.

There are some headlamps available that include a swivel mount to allow the lamp to be rotated so that it always points in the forward direction of the bicycle, regardless of the orientation of the mounting clamp itself. These types of headlamps are typically attached to the bicycle handlebar with the use of screws, or other mechanisms which require tools. As a result, it is not convenient for the bicycle rider to easily attach and remove the headlamp from the handlebar. For example, if it is necessary to perform repairs upon the chain or rear tire of the bicycle during nighttime riding, it is desirable for the rider to be able to remove the headlamp from the handlebar and place it near the rear of the bicycle while the repairs are being carried out. When the removal and remounting requires tools, however, the rider is not inclined to carry out this action in addition to the necessary repairs.

To facilitate removal, some bicycle headlamps are comprised of two separable assemblies, a mounting assembly and the headlamp itself. These systems enable the headlamp to be removed and located at a convenient position for effecting repairs. However, the mounting assembly still is attached to the handlebar by means of screws or the like, so that it is not readily removable from the bicycle without tools. It is not uncommon for a bicycle rider to own two or more different bicycles, for example, for different riding conditions. If the rider desires to be able to readily mount the headlamp on either of the two bicycles, it is necessary to obtain a second mounting assembly, so that each bicycle has its own, permanently attached mounting assembly. This type of system is not totally acceptable, because of the cost associated with a second mounting assembly and the unsightliness of having a mounting assembly attached to the bicycle when the headlamp is not in use.

Further along these lines, bicycle headlamps are typically designed for a single type of riding situation. For reasons of affordability, the majority of the headlamps provide low power lighting, which is suitable for most on-road riding situations. These types of headlamps contain internal batteries such as dry cells or rechargeable Ni-Cad cells which must be removed from the headlamp for charging. Some riding situations, such as off-road riding, have higher power lighting requirements. Headlamps designed for this purpose may have an external power source, such as a battery pack or a generator driven by the bicycle wheel. Typically, a headlamp designed for low-power requirements cannot be adapted to accommodate a high-power lighting situation. It is desirable, therefore, to provide a single headlamp which can be readily adapted for either type of lighting requirement.

Another concern that relates to of headlamps for bicycles is the location of the center of gravity of the headlamp relative to the mounting point. In many headlamp designs, the headlamp is in a cantilevered relationship with respect to the handlebar. In these types of designs, the center of gravity of the headlamp is not aligned with the handlebar or other mounting point. When the bicycle undergoes an impact, such as the type that is typically encountered in off-road riding, the force of the impact will cause the cantilevered mounting arrangement to rotate about the axis of the handlebar. Consequently, the headlamp might be pointing in a downward direction, rather than forwardly of the bicycle. As a result, the appropriate area will not be lighted and the rider will be forced to remove his hand from the handlebar and realign the position of the headlamp, posing an inconvenience and a safety hazard.

BRIEF STATEMENT OF THE INVENTION

The present invention provides a compact, rugged and versatile lighting system that is particularly suitable for use with bicycles and encompasses all of the features desired by the discriminating rider. One feature of a headlamp incorporating the present invention is a mounting system which requires no tools to install or remove, and which can be easily attached to any of a number of different areas on a bicycle. The flexible mounting system includes a clasp and strap arrangement which can be clamped on any tubular area of the bicycle, such as a handlebar. A flexible strap wraps around the attachment position, and the clasp tensions the strap and locks the headlamp in position. The clasp is attached to a main mounting seat by means of rotary nibs that form a rotational axis for the clamp. The point of attachment of the strap to the clasp is offset from the nib axis so that, as the clasp is rotated about the nib axis, the strap is tensioned in a manner which holds the clasp in its fixed position. Because of the ease of use afforded by this arrangement, the headlamp can be easily fixed at any position on a bicycle to direct a beam of light in a desired direction, and can be readily moved from one bicycle to another without requiring extra parts.

Another feature of the headlamp according to the present invention is a housing which contains all of the components of the headlamp, including the batteries, in a compact, economical and rugged manner. The housing is designed such that the center of gravity of the headlamp coincides with the gravitational forces acting on the headlamp, so no moment arms are created that would cause the headlamp to rotate about its mounting point when the bicycle is subjected to impact.

A further feature of the mounting system is a rotational arrangement that enables the housing to be rotated to any position relative to the mounting point, to provide flexibility for the location of the headlamp on the bicycle. The rotational arrangement includes a main screw that is located along the rotational axis and connects the various components of the headlamp together. A clamp coupling isolates the screw from the rotational movement, to thereby prevent loosening of the screw when the lamp is rotated. In addition, the clamp coupling and screw arrangement allows the degree of friction between the housing and the mounting assembly to be adjusted to a level suitable to the user. The combination of the flexible mounting system and the rotary joint allow the beam of light to be pointed in any direction without concern over the orientation of the structure on which it is mounted.

A further feature of the headlamp according to the present invention is an adjustable focusing mechanism that allows the operator to vary the light distribution pattern. The focusing mechanism is designed to allow the operator to adjust the distribution pattern through rotation of a lens reflector assembly, relative to the housing. Due to its design, the lens reflector assembly can be rotated an unlimited number of times in either direction to adjust focus, without loosening or binding the assembly. Thus, in combination with the quick release mounting system, the headlamp can be readily switched from a road bike, where a narrow beam is desirable for high speed riding, to an off-road bike, where a wider beam is preferred.

Along these same lines, the lighting system of the headlamp is upgradeable to accommodate the desires of different users and the requirements of different riding situations. In its most economical form, the headlamp comprises a self-contained, battery-powered system that provides low power lighting that is suitable for most riding conditions. For those riders who desire a greater amount of light, a higher wattage light bulb can be readily inserted, and high power rechargeable batteries can be used. For this arrangement, the headlamp includes a jack to enable the batteries to be recharged without the need to remove them. If a greater amount of power and/or longer battery life are desired, an external battery pack or generator is connectable to the headlamp through the same jack.

The combination of all of these features provide, in a single unit, a headlamp which is sufficiently compact and versatile to meet the needs of a number of different types of bicycling enthusiasts. Further features and advantages of the present invention are described hereinafter with reference to a preferred embodiment illustrated in the drawings.

DESCRIPTION OF THE ILLUSTRATED EMBODIMENT

A portable headlamp constructed in accordance with the present invention is particularly suited for use with bicycles. To facilitate an understanding of the features of the headlamp, it is described hereinafter with particular reference to its use on a bicycle. As will become apparent from the following description, however, the application of the headlamp is not limited to this particular environment. Rather, the headlamp can be used in any situation in which it is desirable to have a portable light source that can be readily attached to a tube or pole, and that can be directed to shine a beam of light in any desired direction without regard to the orientation of the structure on which it is mounted.

Figure 1:
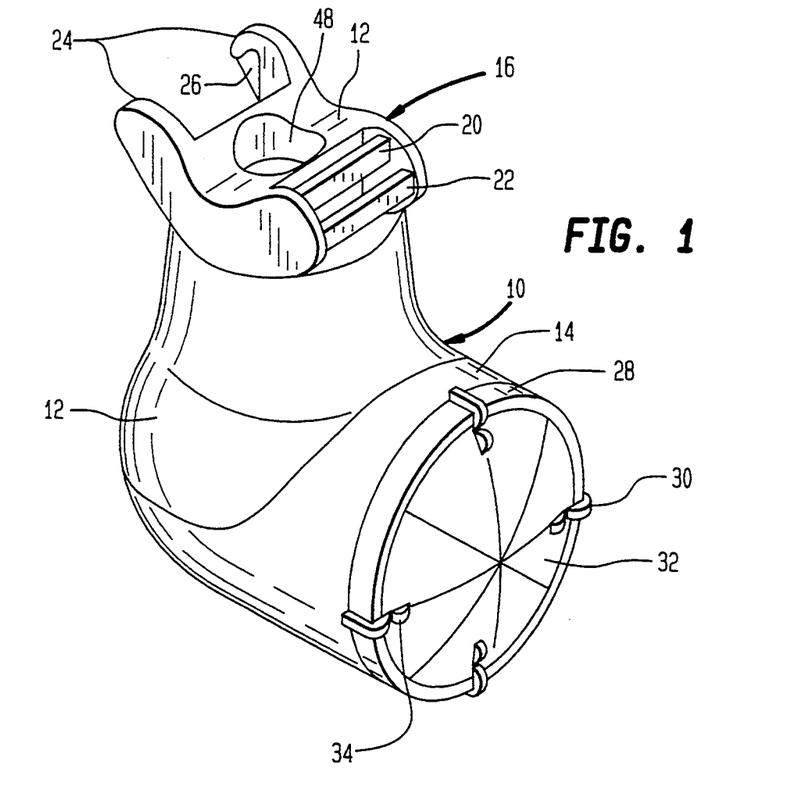
FIG. 1 is a perspective view of the exterior of a portable headlamp constructed in accordance with the present invention.

A perspective view of a bicycle headlamp in accordance with the present invention is shown in FIG. 1. The headlamp comprises a housing 10 that is generally L-shaped. To facilitate insertion and removal of batteries, the housing is divided into two parts, an upper housing 12 and a lower housing 14. Generally speaking, the lower housing 14 defines a horizontal axis or leg for the body, and the upper housing 12 defines a vertical axis or leg of the L-shaped body.

Figure 2:
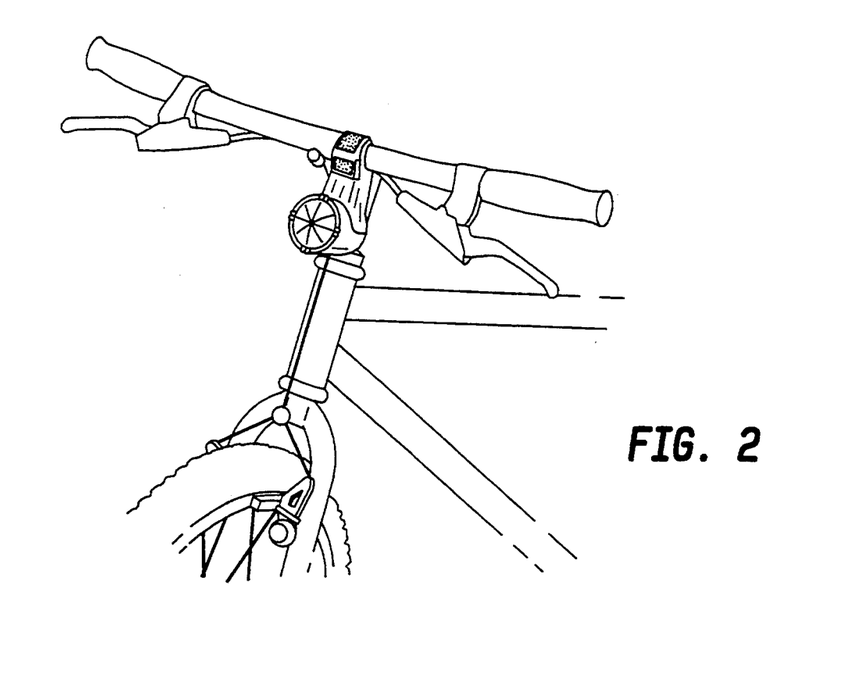
FIG. 2 is a perspective view of the headlamp mounted on the handlebar of a bicycle.

Attached to the upper end of the upper housing 12 is a clamp seat 16. The clamp seat 16 is rotatable relative to the housing 10, and defines a mounting surface 18 which abuts the tube or pole to which the headlamp is to be attached. Preferably, the surface 18 has a concave contour to accommodate a tube or pole. A strap (not shown in FIG. 1) is attached to the clamp seat to be wrapped around the tube or pole, to hold the headlamp in place. To this end, the clamp seat includes a pair of spaced horizontal bars 20 and 22 on one side thereof. These bars provide an adjustable attachment for the strap. On the opposite side of the clamp seat is located a pair of spaced projections 24 having recesses 26 on the opposed surfaces thereof. As described in detail hereinafter, these recesses receive a clasp attached to one end of the strap, to secure the headlamp in place, as shown in FIG. 2.

A focusing ring 28 is attached to the end of the lower housing 14. The ring 28 has a number of spaced projections 30 around its peripheral surface, to enable it to be readily grasped and rotated relative to the housing 14. A lens 32 is removably mounted on the focusing ring 28. For example, the lens can be attached to the ring 28 by means of a bayonet-type mount. Preferably, the lens includes a series of projections 34 to enable the lens to be rotated relative to the ring, so that it can be readily removed for replacement of a light bulb.

Figure 3:
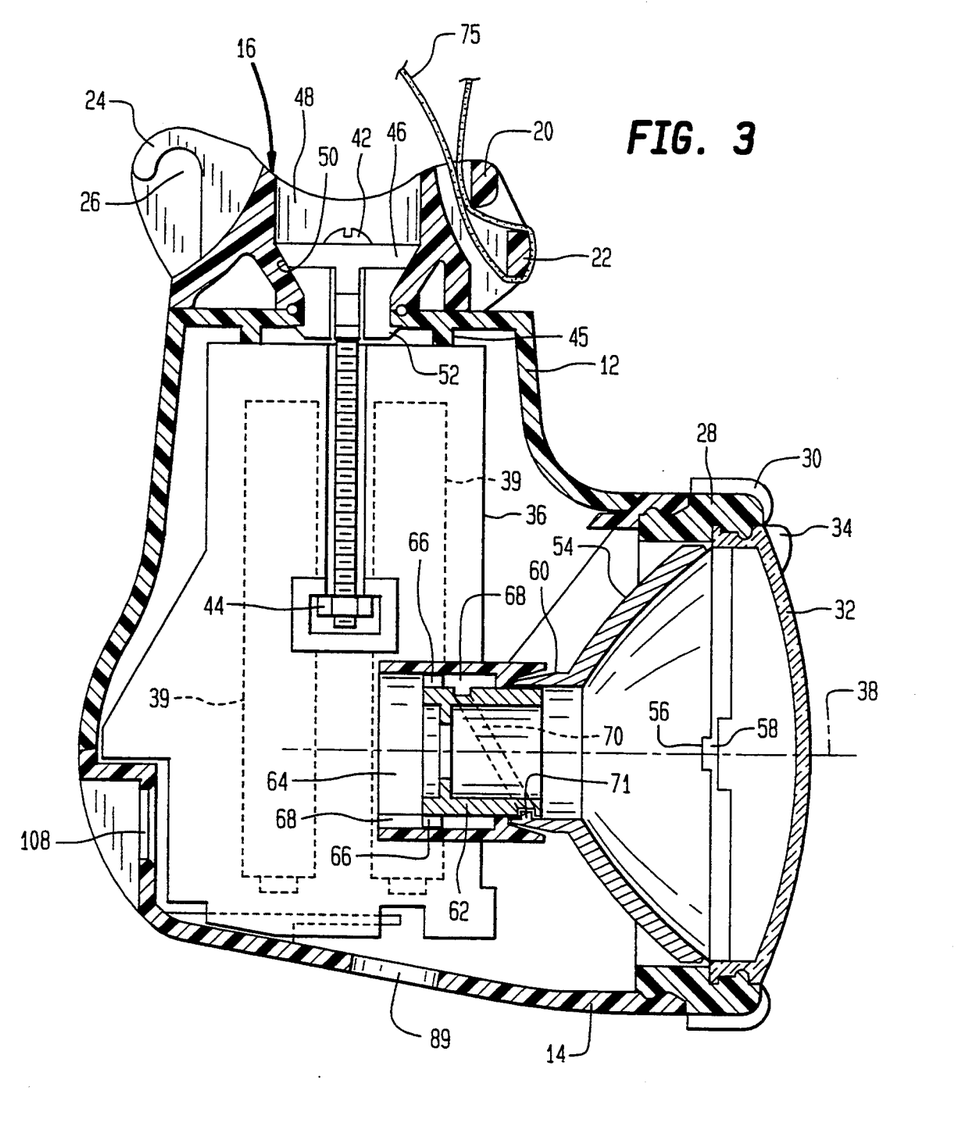
FIG. 3 is a cross-sectional side view of the headlamp.
Figure 8:
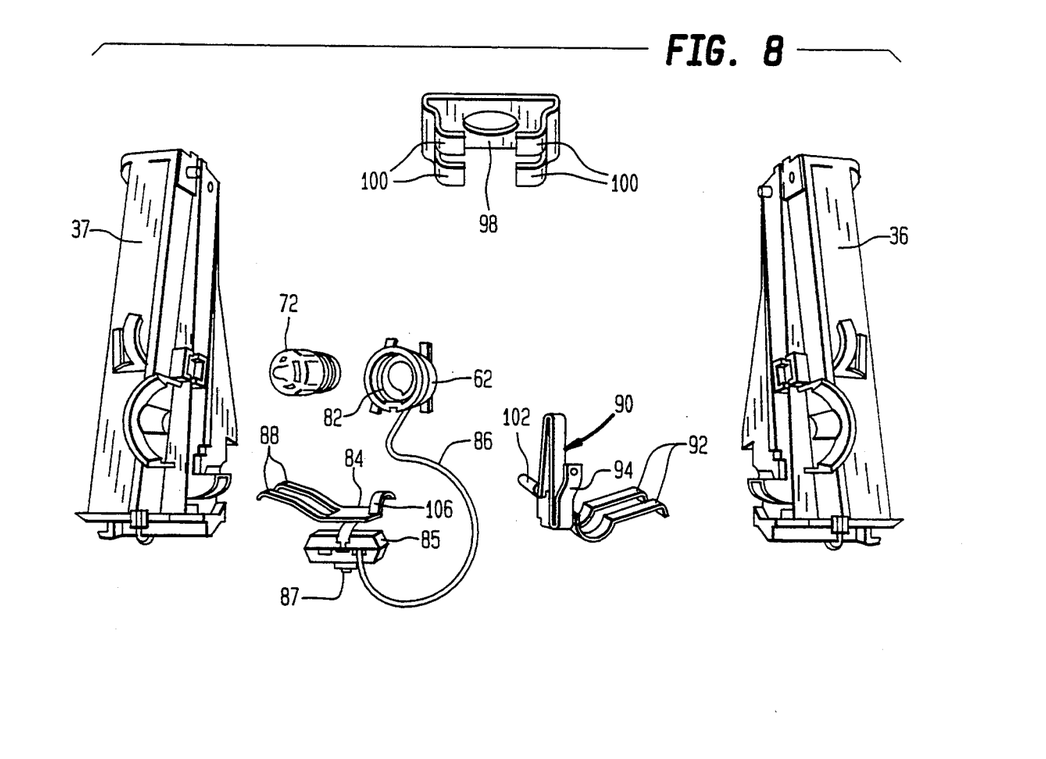
FIG. 8 is an exploded view of the electrical components of the headlamp.

FIG. 3 is a cross sectional side view of the headlamp, illustrating its components in greater detail. Located within the housing is a battery carriage. The battery carriage is preferably formed of two halves 36 and 37 which are mirror images of one another, as best seen in FIG. 8. The interface of these two halves lies along a vertical plane located on the optical axis 38 of the headlamp. In the sectional view of FIG. 3, the inside surface of one of the components 36 of the battery carriage is shown. The batteries 39 are attached to the outside of the battery carriage in a vertically oriented manner, and are shown in phantom in FIG. 3.

The battery carriage is attached to the lower housing, so that it remains in the position shown when the two halves of the housing are separated. After the batteries have been inserted in place within the carriage 36, 37, the upper housing 12 is placed on the lower housing, to encase the battery carriage. A threaded connector such as a screw or bolt 42 is passed through the clamp seat 16 and the upper housing 12, and engages a nut 44 that is trapped between the two halves of the battery carriage. Tightening of the bolt 42 causes the battery carriage 36, 37 to be pulled toward the top of the upper housing, until it engages a rib 45 on the underside of the upper housing. Since the bottom of the battery carriage is secured to the lower housing 14, tightening of the bolt 42 causes the upper housing 12 to be securely attached to the lower housing. Preferably, a gasket (not shown) is placed between the two portions of the housing, to form a water-tight seal.

The bolt 42 does not directly contact the clamp seat 16. Rather, a clamp coupling 46 is disposed within a bore 48 in the clamp seat 16. The lower portion of the bore 48 has a conical surface 50, and the clamp coupling 46 has a complementary surface. The clamp coupling 46 is secured to the top of the upper housing 12 by means of hooks 52 which fit into cutouts in the top of the upper housing. The mating conical surfaces of the clamp coupling and the bore 50 within the clamp seat provide for rotational movement between the clamp seat and the housing 12. Since the clamp coupling 46 is stationary with respect to the housing, the bolt 42 is isolated from the rotational movement of the clamp seat 16, i.e., all of the surfaces which the bolt 42 and nut 44 contact are stationary relative to one another. Thus, rotation of the housing 12 relative to the clamp seat 16 will not cause the bolt 42 to become loosened from the nut 44.

With this arrangement, after the battery carriage 36, 37 engages the rib 45 on the upper housing, the bolt 42 can be tightened a suitable amount to provide a preferred degree of friction between the clamp coupling 46 and the conical surface 50 of the clamp seat 16. Once the proper amount of friction is provided, the bolt will remain in this position to maintain the selected degree of friction even when the clamp seat and the housing 12 are rotated relative to one another.

It can be seen from the illustration of FIG. 3 that the bolt 42 lies along the rotational axis of the clamp seat, and the batteries 39 are symmetrically disposed about this axis. In addition, the bottom of the contoured surface 18 of the clamp seat 16 is located along the vertical rotary axis. Since the batteries constitute the heaviest components within the headlamp, the arrangement illustrated in FIG. 3 causes the center of gravity of the headlamp to be located substantially near the vertical rotary axis. When the headlamp is mounted underneath the handlebar in the position shown in FIG. 2, its center of gravity is located almost directly below the point of attachment to the handlebar. As such, when a bicycle undergoes sudden impact caused by a bump or the like, the gravitational forces on the headlamp will cause it to remain in place, rather than create a moment arm which causes it to rotate about the handlebar on which it is mounted.

The optical axis of the headlamp is coincident with the horizontal axis of the L-shaped body. Located within the horizontal leg of the body is a reflector 54. The reflector 54 is mounted on the focussing ring 28, for rotation therewith. For example, the circumferential surface of the reflector 54 can be provided with recesses 56 that mate with corresponding bosses 58 on the interior of the focussing ring 28, so that these two components move in unison. The reflector has a suitable parabolic or elliptical shape, to provide a beam of light of desired width. A sleeve 60 is provided in the center of the reflector, to accommodate a focussing barrel 62 which houses a light bulb (not shown in FIG. 3).

Essentially, the focusing barrel 62 forms a socket in which the light bulb is mounted. For clarity of the illustration, the light bulb itself and the electrical connections between the light bulb and the batteries are not been shown in FIG. 3. The focussing barrel 62 is free to translate along the optical axis 38, within a channel 64 formed by the mating halves of the battery carriage 36. Rotation of the barrel is prevented, however, by means of flanges 66 on the barrel, which ride within slots 68 formed along the channel 64.

To impart translational movement to the focussing barrel, and the light bulb mounted within it, the outer circumferential surface of the barrel is provided with a helical groove or track 70. A pin 71 on the interior of the reflector sleeve 60 fits within this track. Thus, as the reflector 54 is rotated by movement of the focussing ring 28, the focussing barrel 62 is caused to translate along the optical axis. As a result, the position of the light bulb relative to the reflector is varied, to thereby vary the width of the beam emitted through the lens 32.

Figure 4:
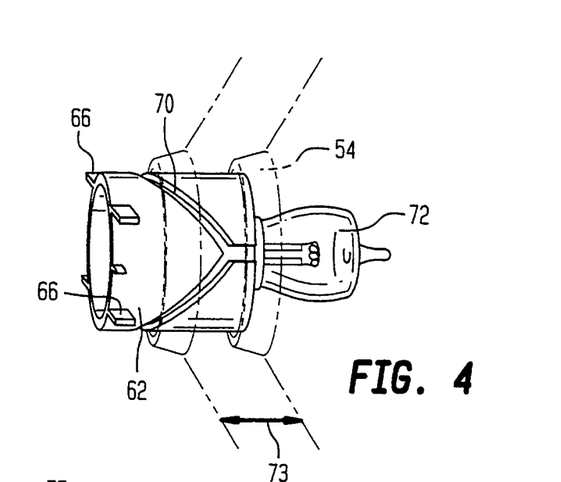
FIG. 4 is a perspective view of the focus barrel and light bulb, illustrating various positions relative to the reflector.

As best shown in FIG. 4, the track 70 preferably forms a sinusoid around the circumference of the focussing barrel 62. With this type of an arrangement, the focussing ring 28 can be turned in either direction to provide a narrower or a wider beam. As the ting is turned, the focussing barrel 62 and the light bulb 72 are translated along the optical axis, as shown by the arrow 73, to vary the width of the beam. The focussing ring 28 can be turned in either direction as many times as the user desires, without reaching a limit and without causing the entire structure to become unscrewed or otherwise fall apart.

Figure 5:
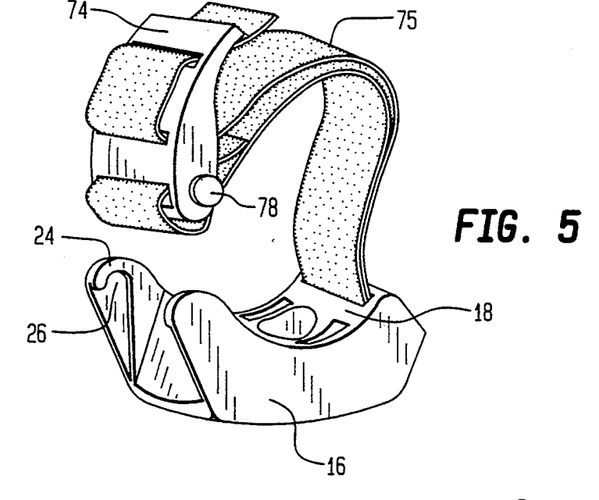
FIG. 5 is a perspective view of the quick-release mounting mechanism.
Figure 6:
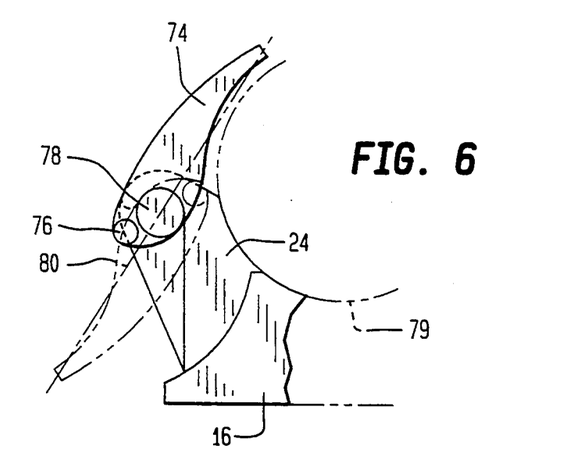
FIG. 6 is a cross-sectional side view of the mounting clasp relative to the mounting seat.

The quick release mounting arrangement for the headlamp is illustrated in greater detail in FIGS. 5 and 6. A strap 75 is attached at one end to one side of the clamp seat 16. To accommodate tubes and poles of varying diameter, the strap 75 is preferably attached so that its length can be adjusted. Referring to FIG. 3, a free end of the strap is passed between the body of the clamp seat 16 and the two spaced bars 20 and 22, and then wrapped around the lower bar 22 and behind the bar 20, to provide a secure connection that is easily adjustable.

The other end of the strap is fixedly attached to a clasp 74. More particularly, the end of the strap is sewn about a bar 76 at the end of the clasp. On the exterior of the clasp, at the two opposite sides thereof, are a pair of aligned nibs 78. These nibs are adapted to fit within the recesses 26 on the projections 24 of the clamp seat 16. The nibs define an axis about which the clasp 74 rotates when the nibs are seated in the recesses 26. As best shown in FIG. 6, this axis is offset from the longitudinal axis of the bar 76 to which the strap is attached.

In mounting the headlamp to a handlebar or the like, the handlebar 79 is accommodated in the concave mounting surface 18 of the clamp seat 16. The strap 75 is wrapped around the handlebar and the nibs 78 of the clasp 74 are inserted in the recesses 26, with the clasp in the position shown in phantom in FIG. 6. In this position, the bar 76 lies to one side of a center line 80 defined by the surface of the handlebar 79 and the rotational axis of the nibs 78. Thereafter, the clasp 74 is rotated about the axis defined by the nib 78, in a clockwise direction as viewed in FIG. 6. As this rotation occurs, the attachment bar 76 approaches the center line 80, moving away from the handlebar 79. This movement of the bar 76 causes the strap to be tensioned, thereby securing the mounting. Once the bar 76 crosses the center line 80 of the nib axis, the force of the tensioned strap pulls on the bar 76, to maintain the clasp 74 securely in place against the handlebar, as illustrated in FIG. 2. Removal of the headlamp from the handlebar, or loosening of the connection to rotate the headlamp around the handlebar, is easily accomplished by merely rotating the clasp 74 from the solid line position shown in FIG. 6 to the position shown in phantom.

Figure 7:
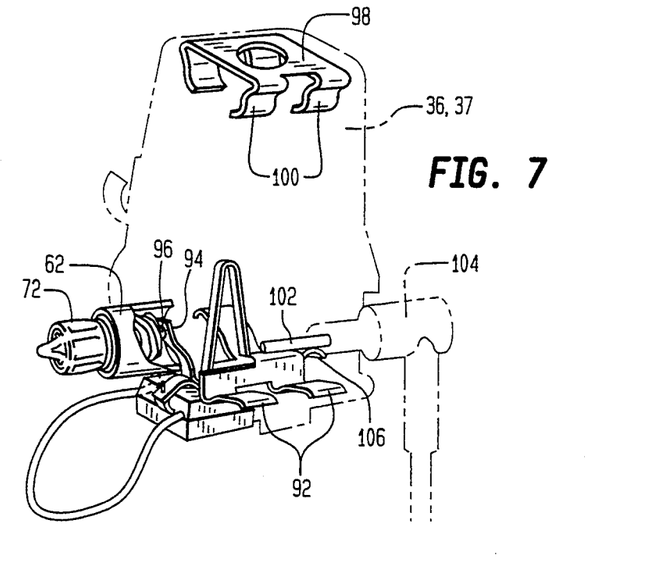
FIG. 7 is a perspective view of the electrical components of the headlamp.

The components which comprise the electrical system of the headlamp will now be described with particular reference to FIGS. 7 and 8. As noted previously, the light bulb 72 is housed within the focussing barrel 62. The bulb 72 is securely held in place by means of a coiled spring 82 mounted within the focussing barrel 62. The coils of the spring function as threads which enable the bulb 72 to be screwed into the focussing barrel 62. In addition, the spring provides as an electrical contact to the casing of the light bulb which serves as a negative terminal. One end of the spring is connected to a negative battery contact 84 by means of a wire 86. The negative battery contact 84 includes a pair of spring leaves 88 which engage the negative terminals of a pair of batteries mounted in the left half 37 of the battery carriage (as viewed in FIG. 8).

Interposed between the negative battery contact 84 and the wire 86 is an on/off switch 85. The switch has a button 87 at the bottom thereof, which is accessible through an aperture 89 in the bottom of the lower housing 14 (see FIG. 3).

Figure 9:
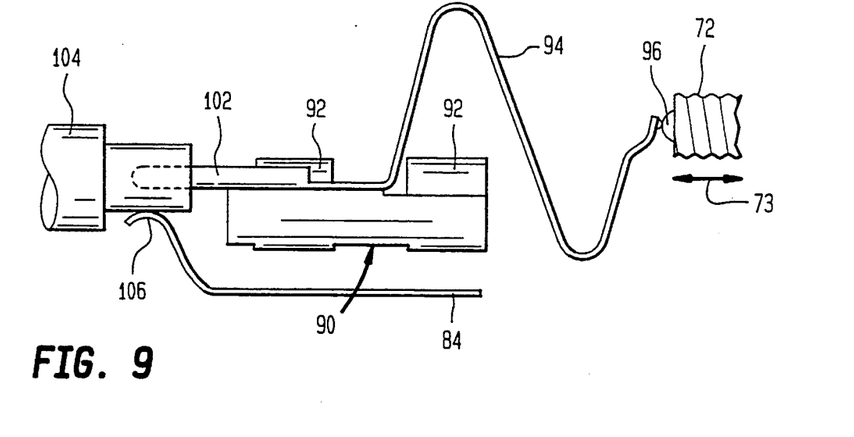
FIG. 9 is a side view of the positive battery contact plate.

A positive battery contact 90 includes a pair of leaves 92 for engaging the positive terminals of two batteries mounted in the right half 36 of the battery carriage. The contact has a contact blade 94 for making electrical contact with the positive terminal 96 on the end of the light bulb 72. As best illustrated in FIG. 9, the blade 94 has an S-shaped configuration. This configuration enables the tip of the blade to remain in contact with the positive terminal 96 of the light bulb 72 as the light bulb is moved in the directions of the arrow 73 when the focussing ring 28 is rotated.

Referring again to FIGS. 7 and 8, a battery contact plate 98 is mounted at the top of the two halves of the battery carriage. The battery contact plate 98 has four leaves 100 which respectively contact the upper terminals of batteries mounted in the battery carriage, thereby connecting the positive terminals of batteries mounted in the left carriage half 37 to the negative terminals of the batteries mounted in the right carriage half 36. In addition, the battery contact plate 98 functions to hold the two halves 36 and 37 of the battery carriage together.

The headlamp is adapted to be readily upgraded to provide the level of light desired by the user. In its most economical configuration designed for regular bicycle riding, the headlamp can be provided with a two-watt light bulb 72, and be powered by four alkaline batteries.

If desired, the headlamp can be upgraded to a rechargeable system, by replacing the alkaline batteries with rechargeable Ni-Cad batteries. For this configuration, the headlamp is provided with a jack that enables the batteries to be recharged while they remain mounted within the battery carriage. The jack includes a circular pin 102 that extends from the rear of the positive battery contact 90. The pin 102 is adapted to fit within the axial bore of a female connector plug 104 from a battery recharger, as shown in FIGS. 7 and 9. The negative battery contact 84 includes a rearwardly extending, spring loaded blade 106 that contacts the exterior, cylindrical terminal of the connector plug 104. Access to the jack formed by the pin 102 and the blade 106 is provided by means of an aperture 108 in the back of the lower housing 14 (see FIG. 3). For optimum light output with the rechargeable batteries, the light bulb 72 is preferably a halogen bulb.

For greater light output requirements, the two-watt light bulb can be removed and replaced with a six-watt or ten-watt light bulb. The exchange of the light bulbs is easily accomplished by means of the bayonet mount for the lens 32, which provides ready access to the light bulb through the front of the headlamp. To accommodate the greater power requirements of the higher wattage light bulbs, the batteries can be removed from the battery carriage, and an external battery pack or wheel-driven generator can be connected to the light bulb by means of the jack formed by the pin 102 and blade 106.

Figures 10, 11:
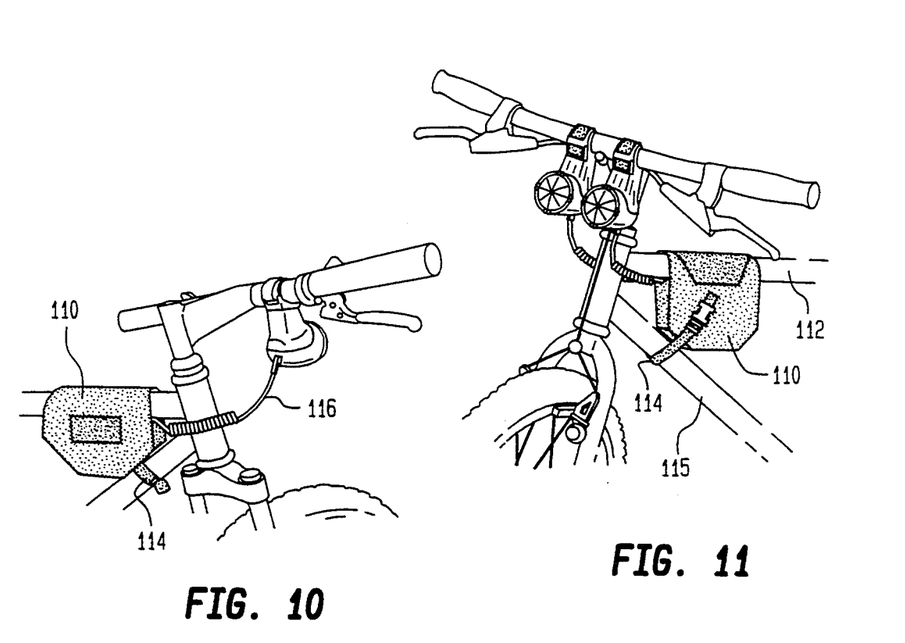
FIGS. 10 and 11 are perspective views of headlamp arrangements which include an external battery pack, mounted on a bicycle.

One example of an external battery pack 110 is illustrated in FIGS. 10 and 11. The battery pack 110 has a flap which can be wrapped around the horizontal crossbar 112 of a bicycle frame to secure the pack thereto. A strap 114 attached to the lower portion of the pack is wrapped around the diagonal frame member 115, to provide stability. The battery pack 110 is connected to the headlamp by means of a coiled cord 116.

To accommodate the heat generated by higher wattage light bulbs, at least the lens 32 and the focussing barrel 62 should be made from a high-temperature plastic. If the reflector 54 is not made of metal, it should also be formed of a high-temperature plastic.

For the greatest amount of light, a dual headlamp system can be employed, as shown in FIG. 11. One of the headlamps can be provided with a six-watt low beam light bulb, and the other headlamp can contain a ten-watt high beam light bulb. Each of the headlamps is connected to the external battery pack, and can be selectively turned on and off through the switch located at the bottom of the housing. Furthermore, each can be adjusted to provide a beam of desired width by means of its focussing ring.

From the foregoing, it can be appreciated that the present invention provides a headlamp having a number of features that contribute to its suitability for use on bicycles and other environments. The easily removable and universally mountable fastening system enables the headlamp to be mounted at any desired position on a bicycle without requiring tools for the installation. In addition, the rotary joint between the mounting arrangement and the main housing of the headlamp allows the beam of light to be pointed in any direction without regard to the orientation of the particular structure on which the headlamp is mounted. Further, the combination of the quick release mounting mechanism, the adjustable focus of the light beam and the upgradeability of the electrical system allows the headlamp to be readily used on different bicycles for different types of riding conditions, without requiring additional hardware for each bicycle.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A portable self-contained safety light, comprising:
a housing having a lens located at one end thereof;
a quick release mounting mechanism attached to said housing for enabling the light to be readily mounted upon and removed from a support member; and
a rotary joint disposed between said housing and said quick-release mechanism for providing rotational movement of said housing, relative to a support member upon which the quick-release mechanism is mounted, said rotary joint including a component of said mounting mechanism having a conically shaped recess, a clamp coupling disposed within said recess and having a complementary conical surface, means for fastening said clamp coupling to said housing, and means for maintaining said clamp coupling stationary with respect to said housing.

2. The bicycle headlamp of claim 1 wherein said fastening means provides an adjustable degree of friction between said clamp coupling and said component of said mounting mechanism.

3. The bicycle headlamp of claim 1 wherein said fastening means includes a threaded connector and said clamp coupling isolates said bolt from said rotational movement of said housing, thereby preventing the loosening of the threaded connector when said housing is rotated.

4. A bicycle headlamp comprising:
a housing having a lens located at one end thereof;
a quick release mounting mechanism attached to said housing for enabling the headlamp to be readily mounted upon and removed from a tubular member of a bicycle, said mounting including a mounting seat having a pair of spaced recesses formed on one side thereof, a strap having one end thereof connected to an opposite side of said mounting seat, and a clasp attached to the other end of said strap, said clasp having a pair of nibs for engaging said recesses in said mounting seat and defining a pivot axis around which said clasp rotates, and means for attaching said other end of the strap to said clasp at a point that is offset from said pivot axis such that, when said strap is secured around a tubular member, said strap exerts a rotational force about said pivot axis that maintains the engagement of said nibs in said recesses; and
a rotary joint disposed between said housing and said quick-release mechanism for providing rotational movement of said housing, relative to a member of the bicycle upon which the quick-release mechanism is mounted.

5. The bicycle headlamp of claim 4 wherein said strap has an adjustable length to thereby securely attach said headlamp to tubular members of different diameters.

6. The bicycle headlamp of claim 4 wherein said rotary joint comprises a component of said mounting mechanism having a conically shaped recess, a clamp coupling disposed within said recess and having a complementary conical surface, and means for fastening said clamp coupling to said housing.

7. The bicycle headlamp of claim 6 wherein said fastening means provides an adjustable degree of friction between said clamp coupling and said component of said mounting mechanism.

8. A bicycle headlamp, comprising:
a generally L-shaped housing defining a pair of legs each having a common end and an end remote from the other leg, said housing having a lens located at the remote end of one of the legs of the housing for projecting a beam of light along an optical axis that is oriented in a direction from the common end toward the remote end of said one leg of the housing;.
a quick-release mounting mechanism attached to the remote end of the other leg of said housing for enabling the headlamp to be readily mounted upon and removed from a tubular member of a bicycle;
a rotary joint disposed between said housing and said quick-release mechanism for providing rotational movement of said housing, relative to a member of the bicycle upon which the quick-release mechanism is mounted, about an axis extending in a direction between the common and remote ends of said other leg of the housing; and
a battery compartment disposed within said other leg of said housing so that the center of gravity of said headlamp, when loaded with batteries, lies substantially along said rotational axis, said battery compartment containing a first battery contact for engaging the positive terminal of batteries loaded in said battery compartment and providing an electrical connection to one terminal of a light bulb mounted within said housing, and a second battery contact for engaging the negative terminal of batteries loaded in said battery compartment and providing an electrical connection to another terminal of the light bulb, said first battery contact including a pin that is accessible from the exterior of said housing and said second battery contact including a spring-loaded blade disposed adjacent said pin to thereby form a jack which provides an electrical connection between the light bulb and a power supply located external to the headlamp.

9. A bicycle headlamp, comprising:
a generally L-shaped housing defining a pair of legs each having a common end and an end remote from the other leg, said housing having a lens located at the remote end of one of the legs of the housing for projecting a beam of light along an optical axis that is oriented in a direction from the common end toward the remote end of said one leg of the housing, a light source mounted within said one leg of the housing, a reflector disposed within said housing in operative relationship with said light source and said lens to reflect light from the light source through said lens, and means for moving said light source along said optical axis, relative to said lens and said reflector, to vary the angle of a beam of light emitted through said lens;

a quick-release mounting mechanism attached to the remote end of the other leg of said housing for enabling the headlamp to be readily mounted upon and removed from a tubular member of a bicycle;

a rotary joint disposed between said housing and said quick-release mechanism for providing rotational movement of said housing, relative to a member of the bicycle upon which the quick-release mechanism is mounted, about an axis extending in a direction between the common and remote ends of said other leg of the housing; and a battery compartment disposed within said other leg of said housing so that the center of gravity of said headlamp, when loaded with batteries, lies substantially along said rotational axis, said battery compartment containing a battery contact having means for engaging a terminal of batteries loaded in said battery compartment and a blade for contacting a terminal on a light source mounted within said housing, said blade being electrically connected to said engaging means and being spring-loaded for movement with said light source along said optical axis so as to remain in contact therewith.

10. A bicycle headlamp, comprising:

a generally L-shaped housing defining a pair of legs each having a common end and an end remote from the other leg, said housing having a lens located at the remote end of one of the legs of the housing for projecting a beam of light along an optical axis that is oriented in a direction from the common end toward the remote end of said one leg of the housing, a quick-release mounting mechanism attached to the remote end of the other leg of said housing for enabling the headlamp to be readily mounted upon and removed from a tubular member of a bicycle, said quick-release mounting mechanism comprising a mounting seat having a pair of spaced recesses formed on one side thereof, a strap having one end thereof connected to an opposite side of said mounting seat, and a clasp attached to the other end of said strap, said clasp having a pair of nibs for engaging said recesses in said mounting seat to thereby secure said strap around a tubular member that is accommodated between said sides of the mounting seat;

a rotary joint disposed between said housing and said quick-release mechanism for providing rotational movement of said housing, relative to a member of the bicycle upon which the quick-release mechanism is mounted, about an axis extending in a direction between the common and remote ends of said other leg of the housing; and a battery compartment disposed within said other leg of said housing so that the center of gravity of said headlamp, when loaded with batteries, lies substantially along said rotational axis.

11. The bicycle headlamp of claim 10 wherein said nibs define a pivot axis and said other end of the strap is attached to said clasp at a point that is offset from said pivot axis such that, when said strap is secured around a tubular member, said strap exerts a rotational force about said pivot axis that maintains the engagement of said nibs in said recesses.

12. The bicycle headlamp of claim 10 wherein said strap has an adjustable length to thereby securely attach said headlamp to tubular members of different diameters.

13. A bicycle headlamp, comprising:

a generally L-shaped housing defining a pair of legs each having a common end and an end remote from the other leg, said housing having a lens located at the remote end of one of the legs of the housing for projecting a beam of light along an optical axis that is oriented in a direction from the common end toward the remote end of said one leg of the housing, a quick-release mounting mechanism attached to the remote end of the other leg of said housing for enabling the headlamp to be readily mounted upon and removed from a tubular member of a bicycle;

a rotary joint disposed between said housing and said quick-release mechanism for providing rotational movement of said housing, relative to a member of the bicycle upon which the quick-release mechanism is mounted, about an axis extending in a direction between the common and remote ends of said other leg of the housing, said rotary joint comprising a component of said mounting mechanism having a conically shaped recess, a clamp coupling disposed within said recess and having a complementary conical surface, and means for fastening said clamp coupling to the end of said other leg of said housing; and a battery compartment disposed within said other leg of said housing so that the center of gravity of said headlamp, when loaded with batteries, lies substantially along said rotational axis.

14. The bicycle headlamp of claim 13 wherein said fastening means provides an adjustable degree of friction between said clamp coupling and said component of said mounting mechanism.

15. The bicycle headlamp of claim 14 wherein said fastening means includes a bolt which passes through said clamp coupling and into said housing, and which is secured to said battery compartment by a nut, such that tightening of said bolt causes said battery compartment to engage said housing and further tightening of said bolt adjusts the degree of rotational friction between said clamp coupling and said component of said mounting mechanism.

* * * * *